US012686229B2

(12) United States Patent
Sorum

(10) Patent No.: US 12,686,229 B2
(45) Date of Patent: Jul. 21, 2026

(54) AUTOMOTIVE WHEEL WITH TOOL-LESS LUG AND INTEGRATED LUG WRENCH

(71) Applicant: FORD GLOBAL TECHNOLOGIES, LLC, Dearborn, MI (US)

(72) Inventor: Justin D. Sorum, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 467 days.

(21) Appl. No.: 18/200,899

(22) Filed: May 23, 2023

(65) Prior Publication Data

US 2024/0391274 A1     Nov. 28, 2024

(51) Int. Cl.
*B60B 3/14* (2006.01)

(52) U.S. Cl.
CPC ..................................... *B60B 3/14* (2013.01)

(58) Field of Classification Search
CPC .. B60B 3/142; B60B 3/14; B60B 3/16; B60B 29/00; B60B 29/003; B60B 29/005; B60B 31/00; B60B 31/06; B60B 27/065; B60B 27/026
See application file for complete search history.

(56) References Cited

U.S. PATENT DOCUMENTS

| | | | |
|---|---|---|---|
| 1,033,211 A | 7/1912 | Sullivan | |
| 1,465,247 A * | 8/1923 | House, Jr. ................. | B60B 3/18 301/35.58 |
| 1,808,462 A | 6/1931 | Horeth | |

| | | | |
|---|---|---|---|
| 2,051,953 A * | 8/1936 | Arney .................... | B60B 29/003 29/521 |
| 2,208,883 A * | 7/1940 | Hall ...................... | B60B 29/001 254/131 |
| 2,512,978 A | 6/1950 | Steinmann | |
| 2,762,900 A * | 9/1956 | Shewmon .............. | H02K 11/23 200/80 R |
| 2,964,981 A * | 12/1960 | Blunt ..................... | B25B 23/16 81/177.2 |
| 4,400,038 A * | 8/1983 | Hosokawa ............ | B60B 27/023 301/124.2 |
| 4,447,091 A | 5/1984 | Nguyen et al. | |
| 4,555,197 A | 11/1985 | Erickson | |
| 4,920,835 A | 5/1990 | Hendricks | |
| 6,443,529 B1 | 9/2002 | Williams | |
| 11,524,522 B2 | 12/2022 | Ivarsson et al. | |

FOREIGN PATENT DOCUMENTS

| | | | |
|---|---|---|---|
| CN | 211029701 U | 7/2020 | |
| DE | 102011112152 A1 * | 3/2013 | ........... B60B 29/006 |
| GB | 1017565 A | 1/1966 | |
| JP | 3162673 B2 | 5/2001 | |
| JP | 2014202357 A * | 10/2014 | |
| KR | 20190070667 A * | 6/2019 | ............... B60B 3/14 |

* cited by examiner

*Primary Examiner* — Kip T Kotter
(74) *Attorney, Agent, or Firm* — Burr & Forman; Lorne Forsythe

(57) ABSTRACT

A wheel assembly may include a wheel body having a body portion, a center lug member operably coupled to the wheel body for rotation to alternately tighten or loosen the wheel body with respect to a wheel hub of a vehicle on which the wheel body is mountable, and a lever arm having a storage position in or proximate to the wheel body and an operating position to which the lever arm is moved from the storage position to enable the center lug member to be rotated responsive to rotation of the lever arm.

12 Claims, 5 Drawing Sheets

AUTOMOTIVE WHEEL WITH TOOL-LESS LUG AND INTEGRATED LUG WRENCH

TECHNICAL FIELD

Example embodiments generally relate to automotive wheels and, more particularly, relate to an automotive wheel that has a tool-less lug due to integration of a lug wrench into the wheel.

BACKGROUND

Vehicles commonly employ wheels that have multiple lugs that attach the wheel (and often more specifically the tire rim) to components of a suspension system of the vehicle. Meanwhile, a special wrench (e.g., a lug wrench) is typically stored separately and must be located prior to use in the event that the lugs need to be removed to allow removal of the wheel. This creates a potentially inconvenient and inefficient situation that could perhaps be remedied, and example embodiments provide such a remedy.

BRIEF SUMMARY OF SOME EXAMPLES

In accordance with an example embodiment, a vehicle suspension system may therefore be provided. The vehicle suspension system may include a vehicle chassis, a wheel assembly, and a suspension assembly operably coupling the wheel assembly to the vehicle chassis. The wheel assembly may include a wheel body having a body portion, a center lug member operably coupled to the wheel body for rotation to alternately tighten or loosen the wheel body with respect to a wheel hub of a vehicle on which the wheel body is mountable, and a lever arm having a storage position in or proximate to the wheel body and an operating position to which the lever arm is moved from the storage position to enable the center lug member to be rotated responsive to rotation of the lever arm.

In another example embodiment, a wheel assembly may also be provided. The wheel assembly may include a wheel body having a body portion, a center lug member operably coupled to the wheel body for rotation to alternately tighten or loosen the wheel body with respect to a wheel hub of a vehicle on which the wheel body is mountable, and a lever arm having a storage position in or proximate to the wheel body and an operating position to which the lever arm is moved from the storage position to enable the center lug member to be rotated responsive to rotation of the lever arm.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
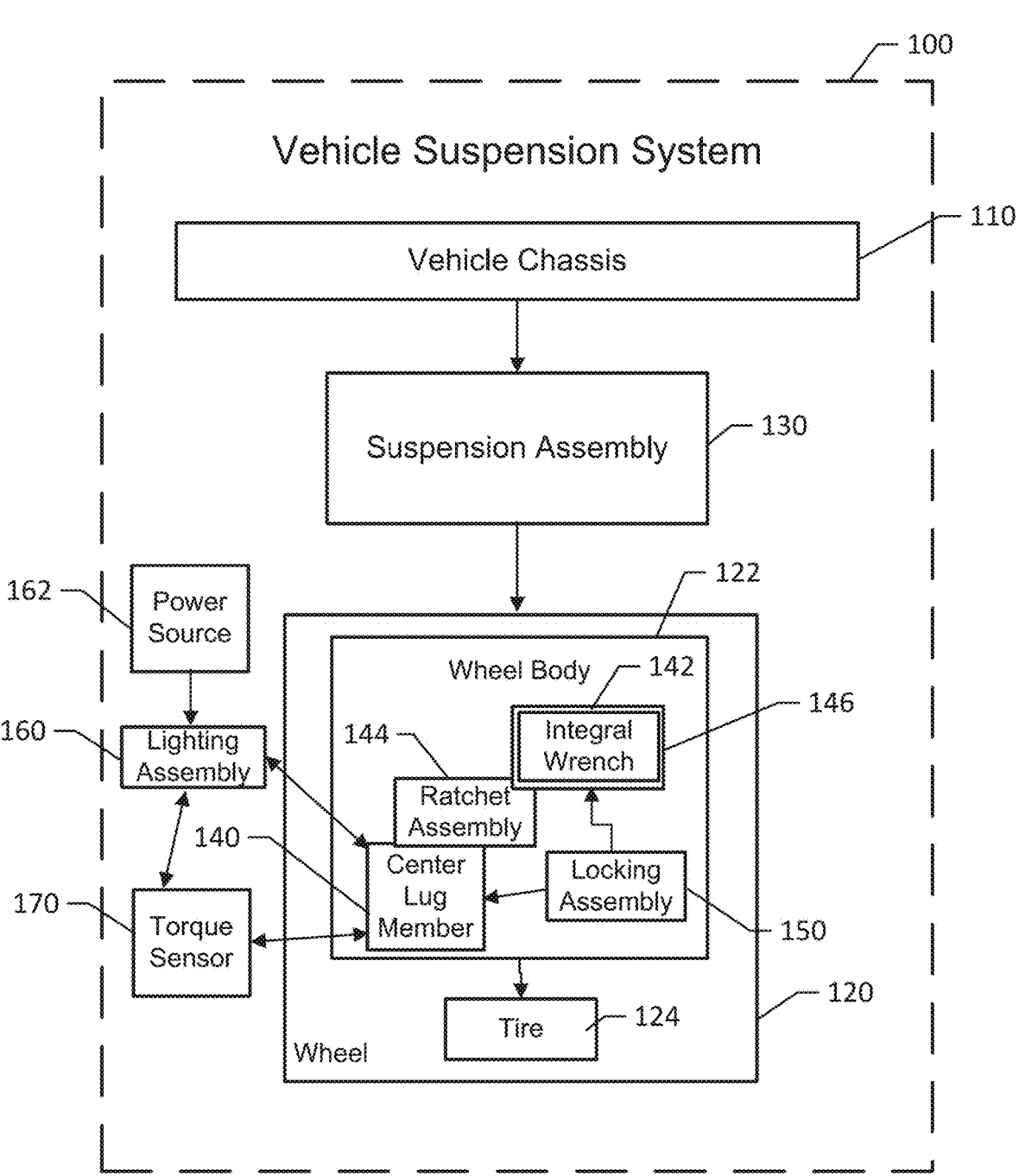
FIG. 1 illustrates a block diagram of a vehicle suspension system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

FIG. 1 illustrates a block diagram of a vehicle suspension system 100 in accordance with an example embodiment. The vehicle suspension system 100 may be operably coupled to a vehicle body, and may support the vehicle body stable while driving by allowing wheels of the vehicle to articulate independently of the vehicle body when driving on uneven driving surfaces or encountering discontinuities while driving on even surfaces. The vehicle suspension system 100 may be employed on a vehicle having any suitable type of propulsion, including battery electric vehicles (BEVs), vehicles powered by internal combustion engines (ICEs), and various hybrid technologies as well.

The vehicle suspension system 100 may include a vehicle chassis 110, a wheel 120, and a suspension assembly 130 that operably couples the wheel 120 to the vehicle chassis 110. In some embodiments, the vehicle chassis 110 may be the frame or platform to which the body of the vehicle is operably coupled. In some other cases, the vehicle chassis 110 may be integrated into the vehicle body. In an example embodiment, the wheel 120 may include a wheel body 122 and a tire 124. The tire 124 may typically be an air-filled or pneumatic tire. However, in other cases, the tire may be an airless tire (e.g., Tweel).

The tire 124 may, in all cases, define the contact patch between the wheel 120 and the driving surface upon which the vehicle operates. The contact patch may therefore be understood to define a circular circumference that is radially displaced from a center that defines an axis of rotation of the wheel 120. The radial displacement may be provided by the wheel body 122, which may include radial spokes or other radially extending structures that extend away from the axis of rotation and out to the tire 124. Thus, as used herein, the wheel body 122 may refer to either a portion or an entirety of the structure that extends from the axis of rotation of the wheel 120 to the tire 124 or contact patch of the wheel 120.

In an example embodiment, the suspension assembly 130 may operably couple the wheel 120 to the vehicle chassis 110 via various structures or components that provide support that is flexible or resilient, yet rigid enough to provide a relatively smooth transit over various terrain types or features that may be encountered. Thus, for example, the suspension assembly 130 may include springs, dampers, links, suspension arms, linkages, knuckles, and/or the like. In an example embodiment, the suspension assembly 130 may include a wheel hub that is operably coupled to brake system components as well, as will be seen in more detail in FIG. 3 below.

The wheel body 122 may include a center lug member 140 that is operable via an integral wrench 142 to tighten the wheel body 122 (and wheel 120) onto the suspension assembly 130. The integral wrench 142 may be considered "integral" in this instance due to the fact that the integral wrench 142 provides a lever arm for acting as a wrench to tighten or loosen the center lug member 140 that is permanently retained at and with the wheel body 122 before, during and after use. As such, the storage position and operating position of the integral wrench 142 are at or in the wheel body 122 and the integral wrench 142 is, although movable relative to at least a portion of the wheel body 122, a necessary component required to make a wholly functional wheel body 122. Thus, for example, removal of the integral wrench 142 (e.g., to store or use it in another location) would render the wheel body 122 incomplete as a functional unit.

In some embodiments, the integral wrench 142 may include or be operably coupled to a ratchet assembly 144 that provides for driving rotation of the center lug member 140 only in one direction (and ratcheting in the opposite direction). Moreover, in some cases, the ratchet assembly 144 may actually be located within or as a portion of the center lug member 140. The driving direction of the ratchet assembly 144 may be selectable via a selector. The integral wrench 142 may be moved, pivoted or folded in some cases between a storage position (e.g., located in a pocket 146 formed in a portion of the wheel body 122) and an operating position (e.g., located out of the pocket 146). The integral wrench 142 may also be locked within the pocket 146 and/or the center lug member 140 may be locked via a locking assembly 150.

In an example embodiment, the locking assembly 150 may include physical structures that are rotatable or engaged manually due to operator action. For example, the locking assembly 150 may include a latch structure, or other lock. However, in some cases, the locking assembly 150 may be magnetic. Thus, for example, a magnet may be located in the pocket 146 to attract the integral wrench 142 and retain the integral wrench 142 in the storage position within the pocket 146 unless manually rotated or folded out of the storage position to the operating position by the operator overcoming the attractive force of the magnet. The center lug member 140 may, in some cases, also include a magnet integrated therein to hold the center lug member 140 on or proximate to the wheel hub of the suspension assembly 130 to facilitate starting threaded engagement between the center lug member 140 and the wheel hub.

Although not required, in some cases, a lighting assembly 160 may be provided to direct a light at, or generally provide light in the vicinity of, the center lug member 140. Thus, in some embodiments, the lighting assembly 160 may include one or more lights (e.g., low voltage lighting or LED lighting) that are provided in a wheel well of the vehicle, and oriented to direct light toward the center lug member 140. In such cases, a power source 162 (e.g., the vehicle battery) may provide power to the lighting assembly 160 via relatively simple wired connection. However, in some cases, the lighting assembly 160 could be located at, or integrated into, the wheel body 122. In such examples, the power source 162 may still be the vehicle battery. However, a more complex electrical connection may be provided through the wheel hub of the suspension assembly 130. The structure and operation of some of the components described above, such as the wheel body 122, the center lug member 140 and the integral wrench 142, for example, will be described in greater detail below in reference to some examples shown in FIGS. 2-4.

Figure 2:
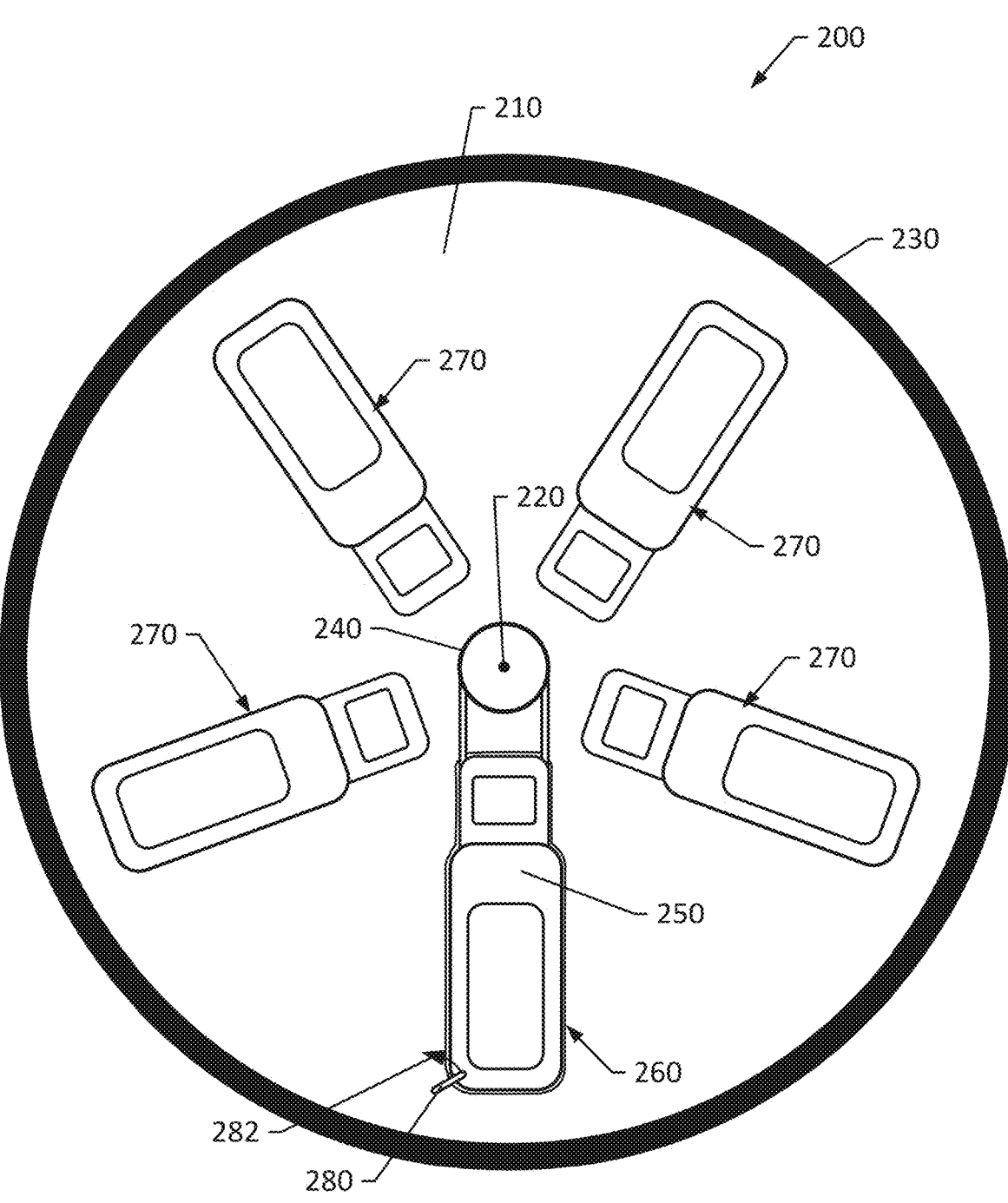
FIG. 2 illustrates a side view of a wheel body in accordance with an example embodiment.

In this regard, FIG. 2 illustrates a side view of a wheel body 200 of an example embodiment in greater detail. Thus, the wheel body 200 is an example of wheel body 122 in FIG. 1. The wheel body 200 includes a body portion 210, which extends radially outward from an axis of rotation 220 of the wheel body 200 to a wheel rim 230, at which a tire (e.g., the tire 124 of FIG. 1) may be mounted. The wheel body 200 further includes a center lug member 240 (e.g., an example of center lug member 140 of FIG. 1) that is disposed coaxial with the axis or rotation 220. The center lug member 240 may be rotatable within the body portion 210, but otherwise may be retained in the body portion 210 such that it is generally not removable (at least from the outside). The center lug member 240 may be configured either as a lug nut (i.e., a threaded fastener that attaches to a threaded protrusion coaxial with the axis of rotation 220) or a lug bolt (i.e., a threaded bolt that inserts into a threaded receiver coaxial with the axis of rotation 220).

The center lug member 240 is operably coupled to an integral wrench 250 (an example of integral wrench 142 of FIG. 1), and is rotatable responsive to corresponding rotation of the integral wrench 250 when the integral wrench 250 is not disposed within a pocket 260 formed in the body portion 210. The pocket 260 may be shaped complementary to a shape of the integral wrench 250 so that the integral wrench 250 fits into the pocket 260 without leaving substantial excess space along outer edges of the integral wrench 250 between the integral wrench 250 and the body portion 210.

In the example shown, the body portion 210 may have a number of aesthetic design elements 270 formed thereon to better the appearance or appeal of the wheel body 200. The aesthetic design elements 270 could be functional as well in some cases (e.g., spokes), but in other cases the aesthetic design elements 270 may have no function beyond appearance. The aesthetic design elements 270 may be formed to extend away from the axis of rotation 220 with relatively equal radial spacing therebetween to generate an appealing appearance. In some embodiments, the integral wrench 250 may be formed to have a shape similar to that of the aesthetic design elements 270 such that, in the side view of FIG. 2 at least, the integral wrench 250 appears to be one of the aesthetic design elements 270 when in the storage position within the pocket 260.

Although not required, the integral wrench 250 may be locked in the pocket 260 by a locking lever 280, which is shown in a locked position in FIG. 2. In this regard, the locking lever 280 (which is an example of the locking assembly 150 of FIG. 1) is pivoted or rotated to a position where it extends from a part of the body portion 210 that is adjacent to the pocket 260 over a portion of the pocket 260 to retain the integral wrench 250 in the pocket 260. The locking lever 280 is rotatable or pivotable in the direction of arrow 282 to be entirely over or proximate to the body portion 210 thereby no longer blocking the integral wrench 250 to retain the integral wrench 250 in the pocket 260. The integral wrench 250 may then be manually removed from the pocket 260 to permit rotation thereof to tighten or loosen the center lug member 240.

Figure 3:
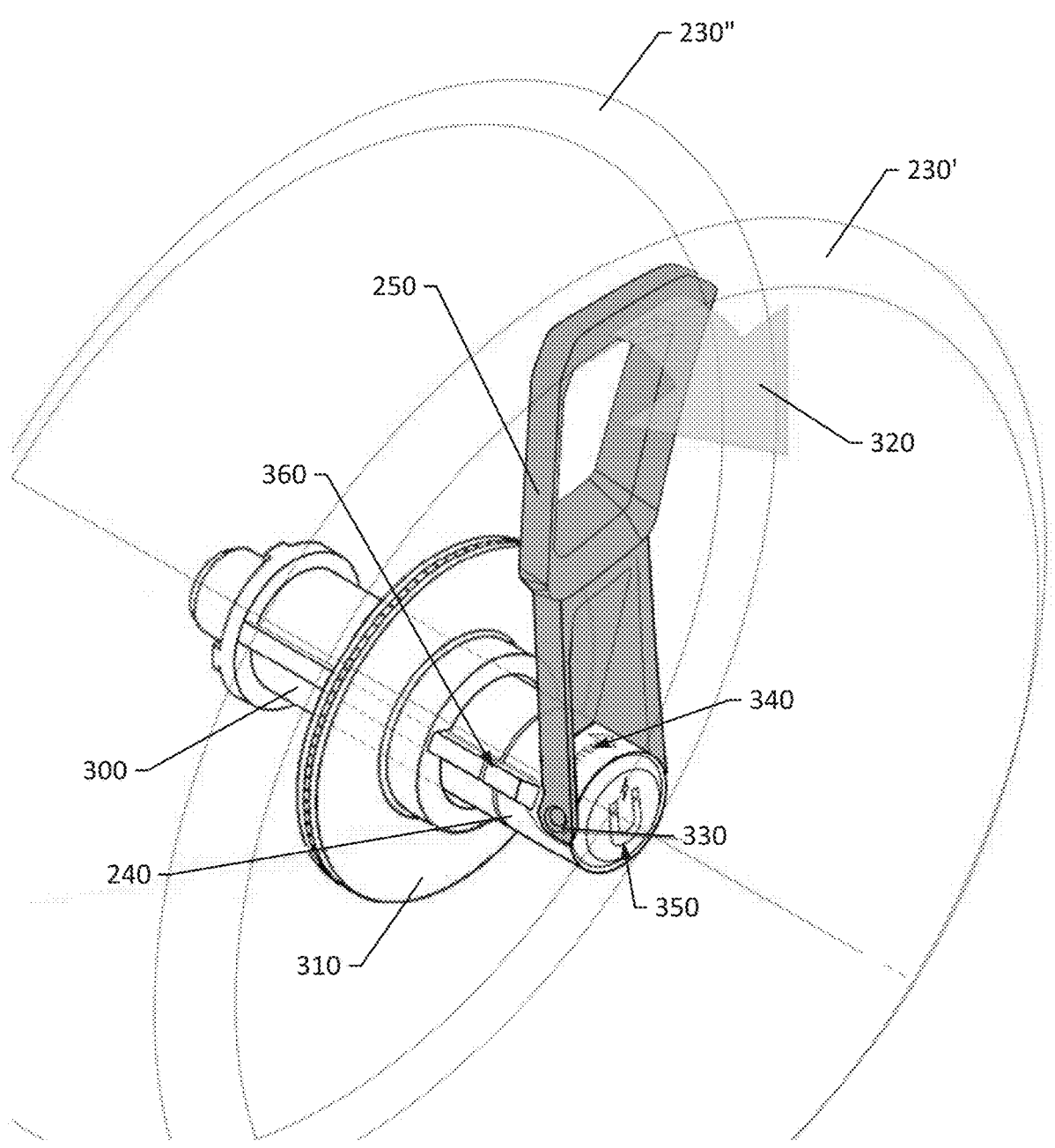
FIG. 3 illustrates a perspective view of the wheel body with the body portion removed in accordance with an example embodiment.

As discussed above, the center lug member 240 may be rotatable within the body portion 210 while retaining the body portion 210 (and therefore the wheel body 200) in attachment to the vehicle (e.g., via wheel hub 300 of FIG. 3. Notably, FIG. 3 is a perspective view of the wheel body 200 with physical walls of the body portion 210 removed to facilitate a view of components otherwise located behind or in the body portion 210. FIG. 3 therefore illustrates the integral wrench 250 in the storage position, which would be in the pocket 260. However, the pocket 260 is not visible since the body portion 210 is removed. A location of an outer rim 230' and inner rim 230" is however shown to provide a frame of reference.

The removal of the body portion 210 (by effectively making it transparent) specifically enables a view of the wheel hub 300 upon which the wheel body 200 is mounted. In this example, the wheel hub 300 also includes a brake rotor 310 of a brake system operably coupled thereto. However, other brake components may be used in other examples, so again the brake rotor 310 merely provides a frame of reference for component location in one example embodiment. As shown in FIG. 3, the wheel hub 300 may extend through the brake rotor 310 to present a distal end thereof for engagement with the center lug member 240. As mentioned above, the center lug member 240 could take the form of either a nut or bolt, and the wheel hub 300 may have complementary engagement threads in either alternative.

The integral wrench 250 may be rotated or pivoted in the direction shown by arrow 320 about a pivot connection 330 formed with the center lug member 240. When in the position shown in FIG. 3, the integral wrench 250 is in the storage position within the pocket 260 (not shown in FIG. 3, but otherwise visible in FIG. 2). When rotated about the pivot connection 330 out of the pocket 260, the integral wrench 250 may be rotated to either tighten or loosen the center lug member 240. Moreover, in some cases, the center lug member 240 may include directional indicia 340 provided thereon to indicate which direction to rotate for tightening and/or loosening the center lug member 240. In examples in which the center lug member 240 further employs magnetism to assist in holding the center lug member 240 proximate to the wheel hub 300 (e.g., during alignment thereof), the center lug member 240 may also have indicia 350 to notify the operator of the magnetic assistance. Additionally, as noted above, the center lug member 240 may be locked (e.g., when in the storage position). In the depicted example, a key lock 360 may be provided to provide a projection and corresponding receiver for the center lug member 240 and a portion of the wheel hub 300 that when aligned, and when the pivot connection 330 is rotated to the storage position, will lock the center lug member 240 to prevent rotation thereof in either direction. In some cases, the pivot connection 330 may have a shoulder portion or other portion thereof that exerts a force on the key lock 360 to urge the key lock 360 toward an opposite end of the wheel hub 300 from the end of the wheel hub 300 that the center lug member 240 engages.

Figure 4:
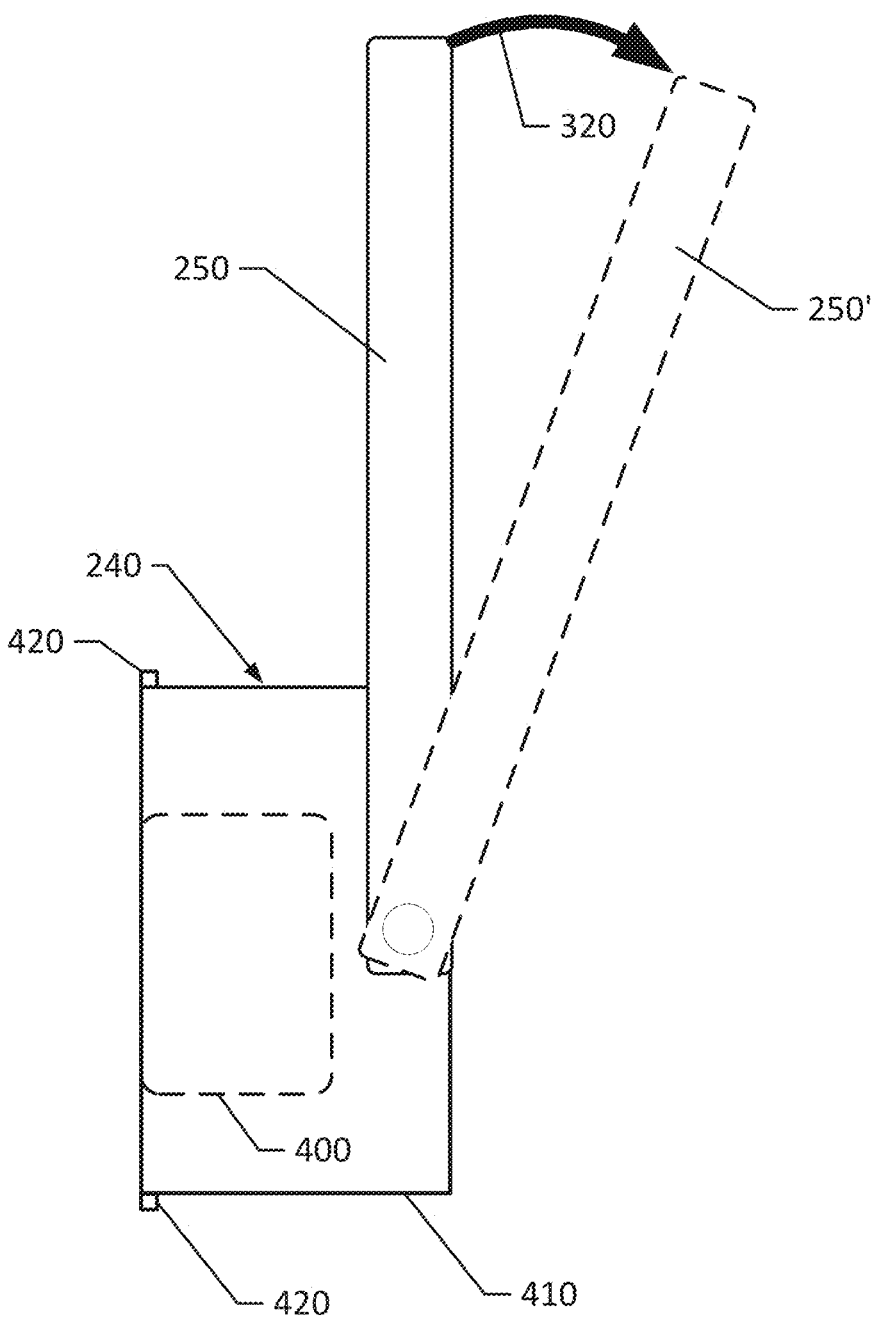
FIG. 4 illustrates a side view of a center lug member and integral wrench in accordance with an example embodiment.

FIG. 4 illustrates a side view of the center lug member 240 and a portion of the integral wrench 250 that is proximate and operably coupled thereto. FIG. 4 illustrates the movement of the integral wrench 250 between the storage position (shown in solid lines and labeled 250') and the operating position (shown in dashed lines). In the storage position, the integral wrench 250 may be in the pocket 260 and may lie in a same plane as a portion of the body portion 210 (assuming the body portion 210 is planar at some portion thereof). Given that the body portion 210 may not always be planar, in some embodiments, the integral wrench 250 may translate between being substantially conformal with an external (and outwardly facing) surface of the body portion 210 when in the storage position to not being conformal when in the operating position. However, even while stowed in the pocket 260, some portions of the integral wrench 250 may not be conformal in some designs. In any case, when rotated to the operating position, the integral wrench 250 may be out of the same plane or no longer conformal, and is certainly out of the pocket 260, thereby allowing rotation of the integral wrench 250. In some embodiments, the angle of pivoting of the integral wrench 250 between the storage position and the operating position may be about 15 degrees. However, some embodiments may rotate in a range between 10 and 35 degrees.

In some embodiments, the center lug member 240 itself may have an inner body 400 and an outer body 410. In such cases, the inner body 400 and outer body 410 may be operably coupled to each other by, for example, the ratchet assembly 144 of FIG. 1. The inner body 400 may physically interact with the wheel hub 300 (e.g., via threaded connection), and the outer body 410 may physically interact with the integral wrench 142. The inner body 400 may be driven, responsive to rotation of the integral wrench 250) in a direction determined by selection of the selector of the ratchet assembly 144. In some examples, the outer body 410 may translate axially away from the wheel hub 300 at least some amount when the integral wrench 250 is folded or pivoted out of the pocket 260. Such axial movement may unlock the center lug member 240 in some cases and/or may provide further clearance to permit full rotation of the integral wrench 250 without interference from the pocket 260.

However, it should also be appreciated that no pocket 260 may be employ at all in some embodiments. In such embodiments, it may be the case that the aesthetic design elements 270 are disposed atop an outer surface of the body portion 210, and therefore extend axially away from the body portion 210. The integral wrench 250 may therefore sit proximate to the body portion 210 instead of being inset therein in any pocket.

Some example embodiments may also provide the center lug member 240 with a retention member 420 that may interface with lip, protrusion, channel, or other retaining feature on the body portion 210 or some other part of the wheel body 200. In the depicted example, the retention member 420 may be a annular projection extending around a circumference of a portion of the center lug member 240. The retention member 420 may prevent withdrawal of the center lug member 240 from the wheel body 200. However, in some cases, the retention member 420 may be keyed to only permit withdrawal from the wheel body 200 when keyed portions of the retention member 420 are aligned with corresponding slots that permit extraction of the center lug member 240 from the wheel body 200. In either case, the center lug member 240 remains fully rotatable when inserted into the wheel body 200.

Figure 5:
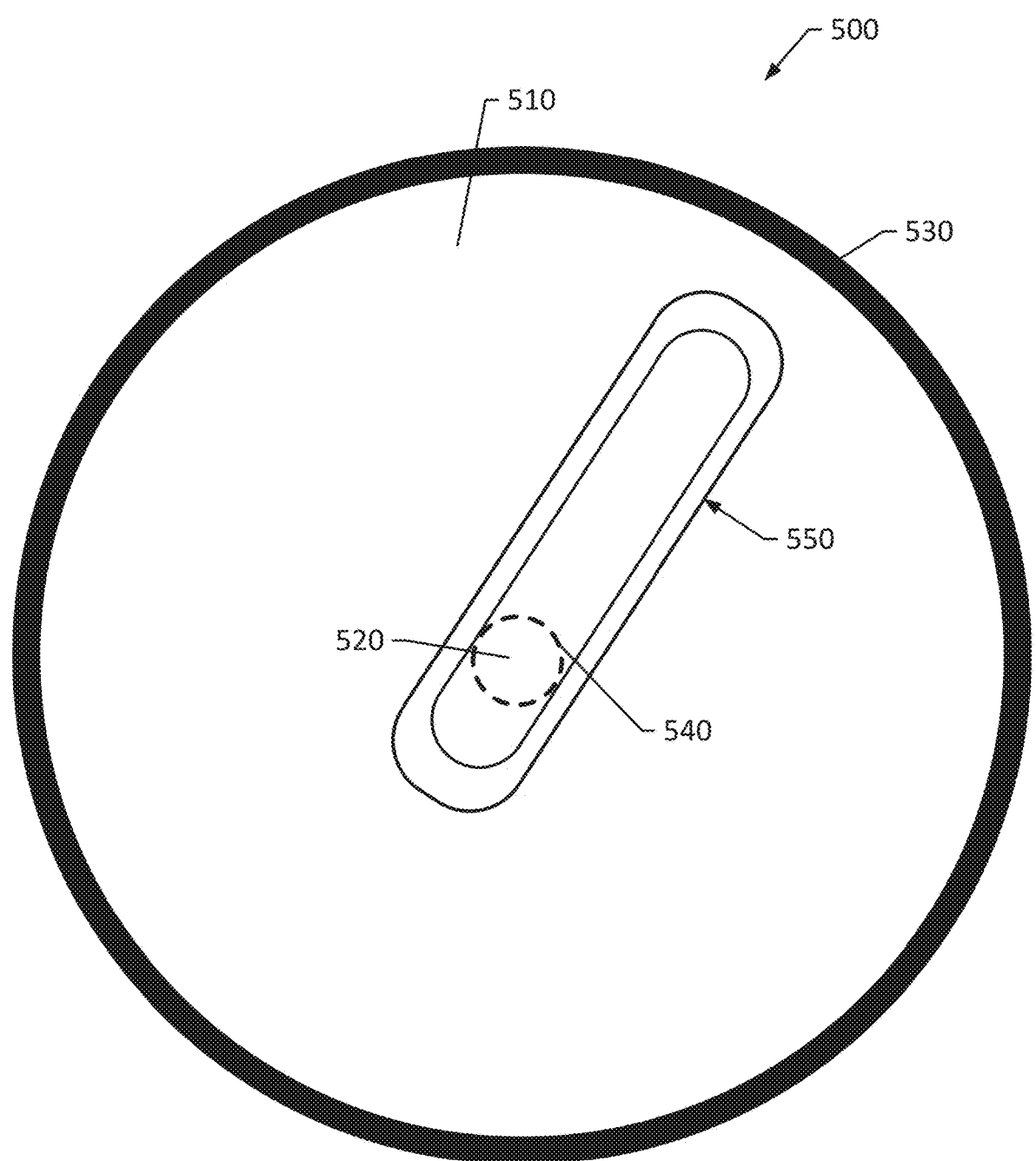
FIG. 5 illustrates an alternative wheel body in accordance with an example embodiment.

In the examples of FIGS. 2 and 3, the integral wrench 250 is a lever arm that is formed with a first and second end that extend radially outwardly from the axis of rotation 220. In this regard, the first end is at the axis of rotation 220, and the second end is displaced from the axis of rotation 220 by the length of the lever arm. However, alternative constructions are possible, and the lever arm need not terminate at the axis of rotation 220. In this regard, for example, FIG. 5 illustrates an alternative embodiment in which the lever arm is longer than the distance from the axis of rotation 220 to the second end. Thus, for example, the axis of rotation 220 is located at some middle portion of the lever arm instead of at an end of the lever arm. In this regard, the wheel body 500 of FIG. 5 has a body portion 510 that may have an axis of rotation 520 and rim 530 similar to those described above. However, instead of the lever arm of integral wrench 550 extending directly at one end thereof from center lug member 540, the center lug member 540 is engaged by the integral wrench 550 at an interior portion of the integral wrench 550. Although not a middle portion, the interior portion at which the engagement between the lever arm and the center lug member 540 occurs could be at a middle portion in other embodiments, and still other constructions are also possible.

A vehicle suspension system may therefore be provided. The vehicle suspension system may include a vehicle chassis, a wheel assembly, and a suspension assembly operably coupling the wheel assembly to the vehicle chassis. The wheel assembly may include a wheel body having a body portion, a center lug member operably coupled to the wheel body for rotation to alternately tighten or loosen the wheel body with respect to a wheel hub of a vehicle on which the wheel body is mountable, and a lever arm having a storage position in or proximate to the wheel body and an operating position to which the lever arm is moved from the storage position to enable the center lug member to be rotated responsive to rotation of the lever arm.

The vehicle suspension system (and more particularly the wheel body) of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the wheel body may include a pocket formed in the body portion, and the lever arm may be disposed in the pocket in the storage position and pivoted out of the pocket in the operating position. In an example embodiment, the pocket may be complementary in shape to the lever arm. In some cases, the lever arm may be conformal with the wheel body when in the storage position. In an example embodiment, the lever arm may have a first end and a second end, and the first end may be operably coupled to the center lug member proximate to an axis of rotation of the center lug member and the second end is disposed radially outward from the axis by a distance substantially equal to a length of the lever arm. As an alternative, the lever arm may be operably coupled to the center lug member proximate to an axis of rotation of the center lug member and the second end is disposed radially outward from the axis by a distance substantially less than a length of the lever arm. In an example embodiment, the wheel body may further include a locking assembly that locks the center lug member responsive to the lever arm being in the storage position. In some cases, the wheel body further includes a locking assembly that locks the lever arm in the storage position. In an example embodiment, the lever arm may drive the center lug member only in a selected direction based on operation of a ratchet assembly. In some cases, the center lug member may be magnetically attracted to the wheel hub via a magnet. In an example embodiment, the wheel body may further include a lighting assembly disposed to direct light toward the center lug member. Alternatively or additionally, a torque sensor may be operably coupled to the center lug member and the lighting assembly may display information about a torque of the center lug member via the lighting assembly. In an example embodiment, the lever arm may rotate or pivot between about 10 degrees and 30 degrees between the storage position and the operating position.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A wheel assembly comprising:

a wheel body having a body portion;

a center lug member operably coupled to the wheel body for rotation to alternately tighten or loosen the wheel body with respect to a wheel hub of a vehicle on which the wheel body is mountable; and a lever arm having a storage position in or proximate to the wheel body and an operating position to which the lever arm is moved from the storage position to enable the center lug member to be rotated responsive to rotation of the lever arm, wherein the wheel body comprises a pocket formed in the body portion, and wherein the lever arm is disposed in the pocket in the storage position and pivoted out of the pocket in the operating position.

2. The wheel assembly of claim 1, wherein the pocket is complementary in shape to the lever arm.

3. The wheel assembly of claim 1, wherein the lever arm is conformal with the wheel body when in the storage position.

4. The wheel assembly of claim 1, wherein the lever arm has a first end and a second end, and wherein the first end is operably coupled to the center lug member proximate to an axis of rotation of the center lug member and the second end is disposed radially outward from the axis by a distance substantially equal to a length of the lever arm.

5. The wheel assembly of claim 1, wherein the lever arm has a first end and a second end, and wherein the lever arm is operably coupled to the center lug member proximate to an axis of rotation of the center lug member and the second end is disposed radially outward from the axis by a distance substantially less than a length of the lever arm.

6. The wheel assembly of claim 1, further comprising a locking assembly, wherein the locking assembly locks the center lug member responsive to the lever arm being in the storage position.

7. The wheel assembly of claim 1, further comprising a locking assembly, wherein the locking assembly locks the lever arm in the storage position.

8. The wheel assembly of claim 1, wherein the lever arm rotates or pivots between about 10 degrees and 30 degrees between the storage position and the operating position.

9. A vehicle suspension system comprising:

a vehicle chassis;

a wheel assembly; and a suspension assembly operably coupling the wheel assembly to the vehicle chassis, wherein the wheel assembly comprises:

a wheel body;

a center lug member operably coupled to the wheel body for rotation to alternately tighten or loosen the wheel body with respect to a wheel hub of a vehicle on which the wheel body is mountable; and a lever arm having a storage position in or proximate to the wheel body and an operating position to which the lever arm is moved from the storage position to enable the center lug member to be rotated responsive to rotation of the lever arm, wherein the wheel body comprises a pocket formed therein, and wherein the lever arm is disposed in the pocket in the storage position and pivoted out of the pocket in the operating position.

10. The vehicle suspension system of claim 9, wherein the pocket is complementary in shape to the lever arm, or wherein the lever arm is conformal with the wheel body when in the storage position.

11. The vehicle suspension system of claim 9, wherein the lever arm has a first end and a second end, and wherein the first end is operably coupled to the center lug member proximate to an axis of rotation of the center lug member and the second end is disposed radially outward from the axis by a distance substantially equal to a length of the lever arm, or wherein the lever arm is operably coupled to the center lug member proximate to an axis of rotation of the center lug member and the second end is disposed radially outward from the axis by a distance substantially less than a length of the lever arm.

12. The vehicle suspension system of claim 9, further comprising a locking assembly, wherein the locking assembly locks the center lug member responsive to the lever arm being in the storage position, or wherein the locking assembly locks the lever arm in the storage position.

\* \* \* \* \*